United States Patent
Peterson et al.

(10) Patent No.: US 11,414,583 B2
(45) Date of Patent: *Aug. 16, 2022

(54) ENHANCED THERMALLY CONDUCTIVE LATEX CUSHIONING FOAMS BY ADDITION OF METAL MATERIALS

(71) Applicant: L&P Property Management Company, South Gate, CA (US)

(72) Inventors: Bruce W. Peterson, Fort Smith, AR (US); Mark L. Crawford, Rudy, AR (US); Matthew D. McKnight, Fort Smith, AR (US)

(73) Assignee: L&P Property Management Company, South Gate, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 16/734,797

(22) Filed: Jan. 6, 2020

(65) Prior Publication Data

US 2020/0140737 A1 May 7, 2020

Related U.S. Application Data

(60) Continuation of application No. 15/360,474, filed on Nov. 23, 2016, now Pat. No. 10,526,518, which is a division of application No. 14/054,071, filed on Oct. 15, 2013, now Pat. No. 9,534,098, which is a continuation-in-part of application No. 13/932,492, filed on Jul. 1, 2013, now Pat. No. 8,933,140, which is a continuation-in-part of application No. 12/713,586, filed on Feb. 26, 2010, now Pat. No. 8,933,139, said application No. 14/054,071 is a continuation-in-part of application No. 13/932,535, filed on Jul. 1, 2013, now abandoned, said application No. 14/054,071 is a continuation-in-part of application No. 12/713,586, filed on Feb. 26, 2010, now Pat. No. 8,933,139.

(60) Provisional application No. 61/667,810, filed on Jul. 3, 2012, provisional application No. 61/667,824, filed on Jul. 3, 2012.

(51) Int. Cl.
| | | |
|---|---|---|
| *C08J 9/00* | (2006.01) | |
| *C09K 5/14* | (2006.01) | |
| *A47C 21/04* | (2006.01) | |
| *A47C 27/15* | (2006.01) | |
| *A47G 9/10* | (2006.01) | |
| *C08K 3/08* | (2006.01) | |

(52) U.S. Cl.
CPC .............. *C09K 5/14* (2013.01); *A47C 21/046* (2013.01); *A47C 27/15* (2013.01); *A47G 9/1036* (2013.01); *C08J 9/0066* (2013.01); *C08K 3/08* (2013.01); *A47G 2009/1018* (2013.01); *C08J 2205/00* (2013.01); *C08J 2205/06* (2013.01); *C08J 2375/04* (2013.01); *C08K 2003/085* (2013.01); *C08K 2003/0812* (2013.01)

(58) Field of Classification Search
CPC .... A47C 21/046; A47C 27/15; A47G 9/1036; A47G 2009/1018; C08J 9/0066; C08J 2205/00; C08J 2205/06; C08J 2375/04; C08K 3/08; C08K 2003/0812; C08K 2003/085; C09K 5/14

See application file for complete search history.

(56) References Cited

U.S. PATENT DOCUMENTS

| | | | |
|---|---|---|---|
| 3,255,128 A | 6/1966 | Farkas et al. | |
| 3,661,809 A | 5/1972 | Pitts et al. | |
| 3,833,951 A | 9/1974 | Hurwitz | |
| 3,931,062 A | 1/1976 | Cobbledick | |
| 4,327,194 A * | 4/1982 | Chandalia | C08G 18/4841 521/99 |
| 4,452,920 A | 6/1984 | Joubert | |
| 4,756,958 A | 7/1988 | Bryant et al. | |
| 4,807,696 A | 2/1989 | Colvin et al. | |
| 4,992,481 A | 2/1991 | von Bonin et al. | |
| 5,152,809 A * | 10/1992 | Mattesky | B24D 15/04 51/295 |
| 5,262,468 A | 11/1993 | Chen | |
| 5,312,847 A | 5/1994 | De Vos | |
| 5,334,646 A | 8/1994 | Chen et al. | |
| 5,336,708 A | 8/1994 | Chen | |
| 5,366,801 A | 11/1994 | Bryant et al. | |
| 5,499,460 A | 3/1996 | Bryant et al. | |
| 5,508,334 A | 4/1996 | Chen | |
| 5,637,389 A | 6/1997 | Colvin et al. | |
| 5,656,344 A | 8/1997 | Sawa et al. | |
| 5,674,606 A | 10/1997 | Powers, Jr. | |

(Continued)

FOREIGN PATENT DOCUMENTS

| | | |
|---|---|---|
| KR | 20040041255 A | 5/2004 |
| KR | 100855053 B1 | 8/2008 |

(Continued)

*Primary Examiner* — John M Cooney (74) *Attorney, Agent, or Firm* — Wood Herron & Evans LLP (57) ABSTRACT

Methods and combinations for making and using one or more thermally conductive cellular foam layers comprising flexible cellular foam and metallic material particulates, and said thermally-conductive cellular foam layers may be located on, under, or in cushioning foams and mattresses or placed between on, under, within, or between other layering substrates to increase the overall cooling capability of the composite. The thermally conductive foam may be used in mattresses, pillows, bedding products, medical cushioning foams, and similar materials used in bedding environments.

15 Claims, 7 Drawing Sheets

(56) References Cited

U.S. PATENT DOCUMENTS

| | | |
|---|---|---|
| 5,722,482 A | 3/1998 | Buckley |
| 5,749,111 A | 5/1998 | Pearce |
| 5,760,117 A | 6/1998 | Chen |
| 5,804,297 A | 9/1998 | Colvin et al. |
| 5,884,639 A | 3/1999 | Chen |
| 5,944,389 A | 8/1999 | Zenba et al. |
| 5,955,188 A | 9/1999 | Pushaw |
| 6,004,662 A | 12/1999 | Buckley |
| 6,048,810 A | 4/2000 | Baychar |
| 6,117,176 A | 9/2000 | Chen |
| 6,183,855 B1 | 2/2001 | Buckley |
| 6,265,457 B1 | 7/2001 | Dolgopolsky et al. |
| 6,319,599 B1 | 11/2001 | Buckley |
| 6,387,973 B1 | 5/2002 | Saleh et al. |
| 6,498,198 B2 | 12/2002 | Pearce |
| 6,720,362 B1 | 4/2004 | Park |
| 6,772,825 B2 | 8/2004 | Lachenbruch et al. |
| 6,855,410 B2 | 2/2005 | Buckley |
| 6,855,742 B2 | 2/2005 | Hager et al. |
| 7,093,599 B2 | 8/2006 | Chen |
| 7,138,175 B2 | 11/2006 | Saito |
| 7,178,866 B1 | 2/2007 | Scott |
| 7,193,002 B2 | 3/2007 | Chen |
| 7,222,380 B2 | 5/2007 | Chen |
| 7,226,484 B2 | 6/2007 | Chen |
| 7,234,560 B2 | 6/2007 | Chen |
| 7,344,568 B2 | 3/2008 | Chen |
| 7,661,164 B2 | 2/2010 | Chen |
| 7,793,372 B2 | 9/2010 | Lean et al. |
| 7,930,782 B2 | 4/2011 | Chen |
| 8,293,808 B2 | 10/2012 | Herrington et al. |
| 8,875,472 B2 | 11/2014 | Korwin-Edson et al. |
| 8,933,139 B1 | 1/2015 | Peterson et al. |
| 8,933,140 B2 | 1/2015 | Peterson et al. |
| 9,023,907 B2 | 5/2015 | Frei et al. |
| 9,534,098 B2 * | 1/2017 | Peterson ................ C08J 9/0066 |
| 10,526,518 B2 | 1/2020 | Peterson et al. |
| 2003/0088019 A1 | 5/2003 | Pause et al. |
| 2003/0203182 A1 | 10/2003 | Thomson |
| 2003/0220432 A1 | 11/2003 | Miller et al. |
| 2004/0229986 A1 | 11/2004 | Pearce |
| 2005/0070620 A1 | 3/2005 | Herrington et al. |
| 2005/0208286 A1 | 9/2005 | Hartmann et al. |
| 2006/0183849 A1 | 8/2006 | Liu et al. |
| 2009/0062432 A1 | 3/2009 | Doesburg et al. |
| 2009/0142551 A1 | 6/2009 | Fox et al. |
| 2009/0212454 A1 | 8/2009 | Smith et al. |
| 2009/0306237 A1 | 12/2009 | Babb et al. |
| 2010/0175810 A1 | 7/2010 | Korwin-Edson |
| 2012/0048528 A1 | 3/2012 | Bergin et al. |
| 2012/0070606 A1 | 3/2012 | Villata |
| 2012/0149795 A1 | 6/2012 | Schleiermacher et al. |
| 2014/0039082 A1 | 2/2014 | Peterson et al. |
| 2014/0183403 A1 | 7/2014 | Peterson et al. |
| 2016/0075929 A1 | 3/2016 | Biggin et al. |

FOREIGN PATENT DOCUMENTS

| | | |
|---|---|---|
| KR | 101228077 B1 | 1/2013 |
| WO | 2005097935 A1 | 10/2005 |
| WO | 2006038761 A1 | 4/2006 |
| WO | 2010129647 A1 | 11/2010 |
| WO | 2011069928 A2 | 6/2011 |

* cited by examiner

ENHANCED THERMALLY CONDUCTIVE LATEX CUSHIONING FOAMS BY ADDITION OF METAL MATERIALS

CROSS-REFERENCES TO RELATED APPLICATIONS

This application is a continuation of U.S. patent application Ser. No. 15/360,474 filed Nov. 23, 2016, a divisional application from U.S. patent application Ser. No. 14/054,071 filed Oct. 15, 2013, now U.S. Pat. No. 9,534,098, which is a continuation-in-part application of U.S. patent application Ser. No. 13/932,492 (which claims the benefit of U.S. Provisional Patent Application 61/667,810 filed Jul. 3, 2012 and is a continuation-in-part application of U.S. patent application Ser. No. 12/713,586 filed Feb. 26, 2010, and issued Jan. 13, 2015 as U.S. Pat. No. 8,933,139) filed Jul. 1, 2013, and issued Jan. 13, 2015 as U.S. Pat. No. 8,933,140; and a continuation-in-part application of U.S. patent application Ser. No. 13/932,535 (which claims the benefit of U.S. Provisional Patent Application 61/667,824 filed Jul. 3, 2012 and is a continuation-in-part application of U.S. patent application Ser. No. 12/713,586 filed Feb. 26, 2010, and issued Jan. 13, 2015 as U.S. Pat. No. 8,933,139), filed Jul. 1, 2013, now abandoned, and all of which are incorporated herein by reference in their entirety.

TECHNICAL FIELD

This invention relates to methods for making and using one or more thermally conductive foam layers comprising flexible cellular foam and metal material particulates, and said layers are located on, under, or in mattresses and bedding products. This invention more specifically relates to various types of thermally conductive foams containing metal material particulates including, but not necessarily limited to, mattresses, pillows, mattress topper pads, quilted toppers, medical mattresses and other bedding products.

TECHNICAL BACKGROUND

Flexible cellular foams such as open-cell polyurethane flexible foams, closed-cell polyurethane flexible foams, latex foams and melamine foams typically have low thermal conductivities in the range of about 0.035 to about 0.060 W/(m K). Materials with low thermal conductivities typically function as insulators, such as rigid polyurethane foam insulation board or expanded polystyrene insulation board.

Heat transfer consists of a combination of the phenomena of conduction, convection and radiation. In a cushion or mattress, heat transfer by radiation is not very large. Instead, heat transfer by conduction and convection are the primary paths for moving heat in and through a cushion or mattress. As a person sleeps on a mattress, the compressed foam underneath the body has reduced air flow paths, and the primary mode of heat transfer in the region below the body is conduction.

Heat is conducted from the body, through the compressed foam and dispersed into cushion or mattress regions where the foam is not compressed as much, which allows natural convection to occur more readily to remove heat from the mattress. Due to the low thermal conductivity of foam, this process is slow and requires a large temperature gradient to drive the conduction of heat at a rate similar to the heat production in a person's body. This results in a large region of hot foam around the body which makes the foam uncomfortable.

U.S. Pat. No. 3,255,128 discloses polyurethane foam compositions containing small particles of metallic aluminum and methods for treating the aluminum particles with phosphoric acid to enhance their usefulness in polyurethane foam. The phosphate aluminum flake was added to insulating polyurethane foam panels to decrease the heat flow through the panels by reducing absorption of heat and radiation.

U.S. Pat. No. 3,833,951 discloses flameproofed mattresses, pillows and sleeping bags. A metallized heat conductive layer is made by mixing a metal with an aqueous vinyl binder, and the frothed mixture is spread on a polyurethane foam having foam thickness between 0.1 to 1.0 inches and dried around 280° C. The final dried coating is 0.5 to 6 mils in thickness.

U.S. Pat. No. 6,772,825 B2 discloses a support surface for patient comfort and to maintain a cool skin temperature by having a refrigerant bladder with boiling point between 23 and 35 degrees Celsius contained within a bladder, a flexible spacer in the bladder such as polyurethane foam, and thermally-conductive aluminum or copper metal strips and a top metal layer located on the outside of the bladder. The strips of metal are used to transfer heat away from refrigerant gas into the surrounding environment. Metallic material was not added to the polyurethane foam reactants prior to producing the foam substrate.

It is useful and desirable to develop improved heat transfer in a cushion or mattress to provide a cooler and more comfortable sleep.

SUMMARY

There is provided, in one non-limiting form, methods of forming an enhanced thermally-conductive cellular foam (referred as "TO Foam" or thermally-conductive foam) comprised of a flexible polyurethane foam and/or polyester polyurethane foam, which may be open or closed celled in nature, and a plurality of metallic material particulates. Phase change materials, colorants, plasticizers, and other performance modifying additives may optionally be incorporated into the TC Foam. The TC Foam contains a metal material in the range of 0.5% to 70% on a weight basis.

Optionally, the TC Foam may be comprised of a plurality of metal material particulates and a latex foam, which may be of open or close celled nature. In this embodiment, phase change materials, colorants, plasticizers, and other performance modifying additives may optionally be incorporated into the TC Foam. The TC Foam contains a metal material in the range of 0.5% to 70% on a weight basis.

Optionally, the TC Foam may be comprised of a plurality of metal material particulates and a melamine foam, which may be of open or close celled nature. In this embodiment, phase change materials, colorants, plasticizers, and other performance modifying additives may optionally be incorporated into the TC Foam. The TC Foam contains a metal material in the range of 0.5% to 70% on a weight basis.

The metal material to be used in methods and compositions described herein may be selected from a non-limiting list of aluminum, copper, iron, steel, silver, gold, platinum, nickel, tin, chromium, vanadium, tungsten, and combinations thereof, or derivatives made from any of those materials combined with oxygen, halogens, carbon, or silicon, and any combination thereof. The metal material may be flakes, powders, crystalline arrangements, particulates, and combinations thereof.

The TC Foam may be cut or molded in many structures such as, but not limited to, planar layers, convoluted layers, surface modified layers, 3D surface texturing, molded pillows, smooth molded surfaces, molded surfaces with regular or irregular patterns, or modified in any way as to generate a desired physical structure such as but not limited to hole punching, channeling, reticulation or other method known to the art of foaming for modifying the structure of foam. The TC Foam may be adhered in the cushion or mattress composite with adhesive or melting of a thermoplastic on the foam surface and allowing the thermoplastic to re-solidify and lock the TC Foam in place on the substrate foam.

There is also provided, in a non-restrictive embodiment, combinations of suitable layering substrates including, but not limiting to, flexible polyurethane foam, latex foam, flexible melamine foam, and other substrates (such as fibers in woven or non-woven form) with one or more TC Foams. Articles that may be manufactured from these combinations of one or more TC Foams substrates including, but not necessarily limited to, mattresses, mattress toppers, pillows, bedding products, pet beds, quilted mattress toppers, pillow or mattress inserts, contoured support foam or other materials commonly used in the bedding environment.

It will be appreciated that FIGS. 1-15 are schematic and that the various elements are not necessarily to scale or proportion, and that many details have been removed or simplified for clarity, and thus the methods and compositions are not necessarily limited to the embodiments depicted in the Figures.

Before the methods and compositions are explained in detail, it is to be understood that these methods and compositions are not limited in its application to the details of construction and the arrangements of the components set forth in the following description or illustrated in drawings. Also, it is understood that the phraseology and terminology used herein are for the purpose of description and should not be regarded as limiting.

DETAILED DESCRIPTION

It is useful to develop improved heat transfer in a mattress or bedding to provide a cooler and more comfortable sleep or contact by incorporating one or more TC foam layers comprising a flexible cellular foam and metal material, such as in the form of particulates, and said one or more TC foam layers are used on, under, or within mattresses, pillows, bedding products, medical cushioning foams, and similar materials used in bedding environments. TC Foam exhibit enhanced heat transfer properties due to possessing an enhanced thermal conductivity.

Flexible cellular foams may be open cell polyurethane foam, closed cell polyurethane foam, open cell polyester polyurethane foam, closed cell polyester polyurethane foam, latex foam, melamine foam, and combinations thereof.

Heat transfer consists of a combination of conduction, convection and radiation. In a mattress or bedding, heat transfer by radiation is not very large. Instead, heat transfer by conduction and convection are the primary paths for moving heat in a mattress or bedding. As a person sleeps on a mattress, the compressed foam underneath the body has reduced air flow paths, and the primary mode in the region below the body is conduction. Heat is conducted from the body, through the compressed foam, into mattress or bedding regions where the foam is not compressed as much, which allows natural convection to occur more readily to remove heat from the mattress. A cooler and more comfortable sleep may be obtained by increasing the thermal conductivity of a mattress or bedding and allowing the heat from the body to migrate away more rapidly.

Enhanced heat transfer reduces the amount of a temperature gradient that is required to generate a given amount of heat flow. This means that for the same amount of body heat, a mattress or bedding with TC foam will be able to have a lower surface temperature of the foam in contact with a person, while still conducting the heat away. This will result in a cooler sleep.

Figure 1:
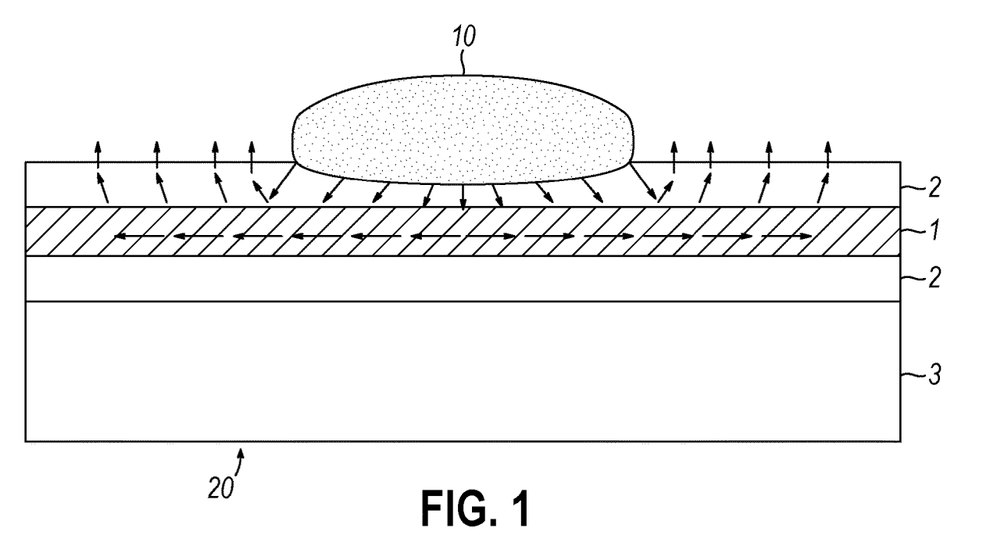
FIG. 1 is an illustration of a possible heat transfer pathway in a mattress cross section.

FIG. 1 is a general representation of a heat transfer path when a person sleeps on a mattress with TC Foam 1 located below the first layer of foam 2. However, FIG. 1 does not represent all the possible combinations of TC Foams and substrate foams.

TC Foams are comprised of an open or closed celled flexible polyurethane or polyester foam that has one or more metallic materials (such as in the form of particulates) dispersed throughout the foam. The term "dispersed" covers random dispersions, uniform dispersions, and combinations thereof of the metallic material particulates in the foam. The TC Foam contains metal material in the range of about 0.5% independently to about 70% on a weight basis. Alternatively, the TC Foam contains metal material in the range of about 1% independently to about 55%, and in another non-limiting embodiment in the range of about 2.5% independently to about 40%, and in a different non-restrictive version in the range of about 4% independently to about 25%. The term "independently" as used in association with various ranges herein means that any lower threshold may be combined with any upper ratio to form a suitable alternative range.

The thermal conductivity of metals is isotropic. The thermal conductivities in all directions in a metal are approximately 5-440 W/(m-° K). The thermal conductivity of polyurethane foam is also isotropic with thermal conductivities in all directions of about 0.035-0.06 W/(m-° K).

Addition of a highly thermally conductive metallic material in a cushion or mattress provides a cooler and more comfortable sleep. The specific metals of interest have thermal conductivities in the range of 5-440 W/(m-° K). If the thermal conductivity of the metallic additives are approximately 200 W/(m-° K), the metallic additives have about 1,500 times the thermal conductivity of foam. Metallic materials are generally anisotropic in nature exhibiting approximately the same thermal conductivity in all directions.

In one non-limiting embodiment, the TC foam (foam plus metal material particulates dispersed therein) may be at least about 0.01 W/(m-° K) higher than the flexible cellular foam with the absence of metal material particulates; alternatively at least about 0.005 W/(m-° K) higher than the flexible cellular foam with the absence of metal material particulates; and in another non-restrictive version, at least about 0.002 W/(m-° K) higher than the flexible cellular foam with the absence of metal material particulates.

The term metals shall be taken to mean an element or its oxides, compound, or alloy or combination thereof that exhibits good thermal conductivity (k>5 W/(m-° K)), and may, but is not necessarily required to, exhibit good electrical conductivity (resistivity, $\rho<10^{-2}$ $\Omega \cdot m$).

Metal materials may include, but are not necessarily limited to, lithium, sodium, potassium, rubidium, caesium, francium, beryllium, magnesium, calcium, strontium, barium, radium, zinc, molybdenum, cadmium, scandium, titanium, vanadium, chromium, manganese, iron, cobalt, nickel, copper, yttrium, zirconium, niobium, technetium, ruthenium, rhodium, palladium, silver, hafnium, tantalum, tungsten, rhenium, osmium, iridium, platinum, gold, mercury, rutherfordium, dubnium, seaborgium, bohrium, hassium, copernicum, aluminum, gallium, indium, tin, thallium, lead, bismuth, polonium, lanthanum, cerium, praseodymium, neodymium, promethium, samarium, europium, gadolinium, terbium, dysprosium, holmium, erbium, thulium, ytterbium, lutetium, actinium, thorium, protactinium, uranium, neptunium, plutonium, americium, curium, berkelium, californium, einsteinium, fermium, mendelevium, nobelium, lawrencium, meitnerium, darmstadtium, roentgenium, ununtrium, flerovium, ununpentium, livermorium, germanium, arsenic, antimony, astatine, and combinations thereof.

Suitable metal materials may include, but are not necessarily limited to, aluminum, copper, iron, steel, silver, gold, platinum, nickel, tin, chromium, vanadium, tungsten, or made from any of those materials combined with oxygen, halogens, carbon, or silicon, or any combination thereof.

Metal compounds have been used in foam as catalytic materials with common materials of this type including, but not necessarily limited to, stannous octoate, dibutyl tin dilaurate, bismuth neodecanoate, and zinc octoate. These catalytic compounds are used in small amounts, typically 0.01% to 0.40% of the foam formulation. Additionally, the binding of the ion in a catalyst structure greatly restricts its ability to function as an element for enhanced thermal transport.

In a non-limiting embodiment, the metal material can be flake, powder, spherical, crystalline arrangements, or other various particulate forms. A suitable size of metal materials may be between about 0.1 independently to about 2000 microns, alternatively between about 1 independently to about 1000 microns, and in another non-limiting embodiment between about 80 independently to about 500 microns. Metals form particulates that tend to be hard and sharp; these are two properties that are undesirable in foam. Sharp particulates can cause accelerated breakdown of the foam by cutting or abrading polyurethane elastomeric portions or foam struts during typical flexing of foam. Additionally, because these particles are often hard, they can be felt against a soft foam creating a rough and sometimes uncomfortable texture. The specific developments described herein are able to control these potentially deleterious effects and produce a flexible open cell polyurethane foam product that is superior to regular open cell polyurethane foam in terms of thermal heat transfer capacity. Most preferred size of metal materials is less 80 to about 500 microns for reducing accelerated compression fatigue.

The TC Foam may also contain useful amounts of conventionally employed additives ("property-enhancing additives") such as plasticized triblock copolymer gels, stabilizers, antioxidants, antistatic agents, antimicrobial agents, ultraviolet stabilizers, phase change materials, surface tension modifiers such as silicone surfactants, emulsifying agents, and/or other surfactants, solid flame retardants, liquid flame retardants, grafting polyols, compatible hydroxyl-containing chemicals which are completely saturated or unsaturated in one or more sites, solid or liquid fillers, anti-blocking agents, colorants such as inorganic pigments, carbon black, organic colorants or dyes, reactive organic colorants or dyes, heat-responsive colorants, heat-responsive pigments, heat-responsive dyes, pH-responsive colorants, pH-responsive pigments, pH-responsive dyes and combinations thereof, fragrances, and viscosity-modifiers such as fumed silica and clays, other TC-enhancing additives and other polymers in minor amounts and the like to an extent not affecting or substantially decreasing the desired properties of the TC Foam.

Metallized plasticized triblock copolymer gels may be produced from high viscosity triblock copolymers and metal materials, optionally with diblock copolymers that have been melted or mixed with a plasticizing agent, such as mineral oil, synthetic oil, etc., and optionally mixed with additives such as colorants, polyols, etc.

Addition of phase change materials to the TC Foam allows the construction composite to store or release energy, which is higher than heat absorbed or released by heat capacity of the non-thermally enhanced construction. Heat is stored if the solid phase change material changes to a liquid, and heat is released when the liquid phase change material changes to a solid. The melting point temperature is usually chosen to be in the 20° C. to 35° C. range to match the human comfort zone. Once the solid phase change material melts completely, all of the latent heat is used, and the phase change material must be cooled back down below its melting point to solidify the phase change material and regenerate for the next melt cycle. Suitable phase change materials have a solid/liquid phase transition temperature from about −10° F. to about 220° F. (about −23° C. to about 104° C.). In another non-limiting version, the phase change solid/liquid phase transition temperature is from about 68° F. to about 95° F. (about 20° C. to about 35° C.).

TC Foams may be prepared by a method or methods including batch-wise or continuous pouring in a form, mold or on a bun production line, and in one non-limiting embodiment, the metal material may be incorporated or blended into the polyol blend in a batch-wise or continuous process in a blending system such as a continuous stirred tank, static mixing elements, air mixers, or any other equipment known in the skill of the art that is used for mixing solids and additives with liquids.

The TC Foam can be poured in a standard bun form on a conveyor, poured in a mold having planar or non-planar surfaces, texturing, and 3D modification, or poured in a mold with rods to make the foam perforated.

In one non-limiting embodiment, one or more TC Foams may be added within or on the surface or in any location within the interior cavity of a mold for making molded products such as, but not limited to, pillows, mattresses, or mattress toppers, and individual substrate components added to the mold to react, bind, or encapsulate the TC Foam.

In another non-limiting embodiment, there may be a smooth gradient transition from a TC foam to a substrate foam of any desired type. By "smooth gradient" is meant that there is no sharp demarcation or boundary between the TO foam and the substrate foam. For a non-restrictive example, a pillow with high TC side and low TC side. Such a gradient dispersion of TC solids in cellular foam may be produced by molded or free rise techniques or combinations of these techniques. A non-limiting example of a gradient-transition foam is using one polyurethane reactant stream with a TC additive and one polyurethane reactant stream without a TC additive, injecting the stream with TC additive in the mold first, followed by injecting the stream without TC additive in the mold, closing mold, and allowing foam to expand in the mold cavity. The resulting molded article would have a higher thermally conductive region on one side of the foam and a lower thermally conductive region on the other side of the foam with a gradient transition between regions. For example, during the summer, a person may select the TC side for a cooler pillow; and during the winter, a person may select the non-TC side to reduce heat transfer from the body. The gradient transition also provides the benefit of higher thermally conductivity while reducing the overall cost of the foam article.

Combinations of using both molding and free rise processes include, but are not necessarily limited to producing a TC layer by a free rise method, cutting it, placing it in a mold, and molding it into a vehicle seat. Alternatively, the mold can be first partially filled with a TC foam and during the same mold pour, the components may be switched to a non-TC foam-forming formulation.

In another non-limiting example, rotational molding techniques may be used. In a non-limiting embodiment, a mold may be coated with TC foam followed up by inserting or forming the substrate within the foam mold.

It will be appreciated that the method described herein is not limited to these examples, since there are many possible combinations for making TC Foams with open or closed cell polyurethane foams or polyester foams that can be used in cushion foams or mattresses. Further details about making foams, including gel-foams, and the foam and gel-foam compositions so made may be seen in U.S. Pat. Nos. 8,933,139; 8,933,140; 9,080,051; and U.S. Patent Application Publication Nos. 2013/0296449, incorporated herein by reference in their entirety.

Applications of the TC Foam

TC Foam can be manufactured and combined with substrate foams for use in a variety of bedding applications, including but not necessarily limited to, mattresses, pillows, pillow toppers, mattress toppers, quilted toppers, body support foam, or other common bedding materials where a cooler feeling foam is desirable.

Layering substrates in combination with one or more TO Foams and optional property-enhancing materials described herein may find utility in a very wide variety of applications. Suitable layering substrates include, but are not limited to, flexible polyurethane foam, flexible polyester polyurethane foam, latex foam, flexible melamine foam, and other substrates (such as fibers in woven or non-woven form), and combinations thereof. More specifically, in other non-limiting embodiments, the combination of TC Foam and substrate would be suitable as pillows or pillow components, including, but not necessarily limited to, pillow wraps or shells, pillow cores, pillow toppers, for the production of medical comfort pads, medical mattresses and similar comfort and support products, and residential/consumer mattresses, mattress toppers, and similar comfort and support products, typically produced with conventional flexible polyurethane foam or fiber. All of these uses and applications are defined herein as "bedding products".

Alternatively, articles may be produced such as a vehicle seat cushion, a back support, and a combination thereof, which comprises of a TC foam layer, flexible cellular foam produced by molding, free rise, and combinations thereof, and a temperature adjustment system. The temperature adjustment system is selected from the group including, but not necessarily limited to, heating through electrical resistance, cooling through a refrigerant, and a combination of both.

FIG. 1 depicts a heat source 10, presumably a body mass, which is introducing thermal energy into the standard, open cell viscoelastic foam layer 2 through conduction. This figure imitates a body lying on a mattress 20. The TC Foam 1 draws heat in and uses enhanced thermal conductivity properties to move heat laterally through the mattress. In turn, heat is conducted and convected through open air cells up through layer 2 to the top of the mattress. At this point, natural convection works to remove heat from the system. In this example, the viscoelastic layer 2 and TC Foam 1 are constructed upon another viscoelastic layer 2 and a foundation of base prime foam 3.

Figure 2:
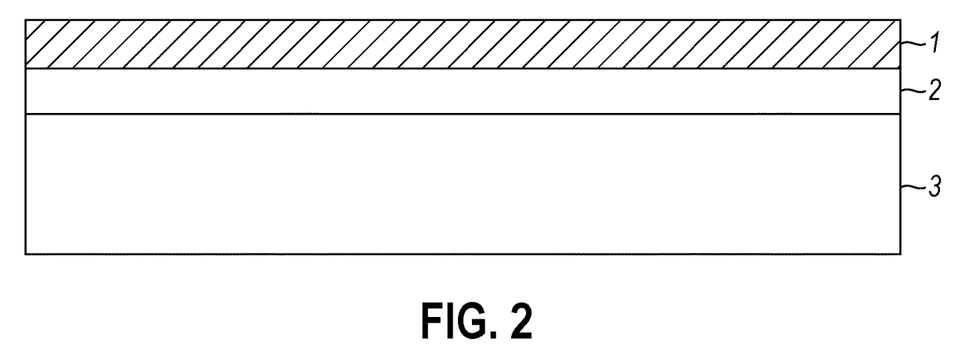
FIG. 2 is the first example construction using a cushion and/or mattress application.

FIG. 2 is a first example of construction using a cushion and/or mattress application. The base of the section is a prime foam layer 3. On top of this is a 2 inch (5 cm) standard, open cell viscoelastic (visco) layer 2. The top layer 1 is a 2 inch (5 cm) layer of TC Foam. It will be appreciated that the dimensions given in the examples and descriptions of the various Figures are merely illustrative and are not intended to be limiting. Throughout the drawings, the same or similar reference numerals will be used for the same or similar structures.

Figure 3:
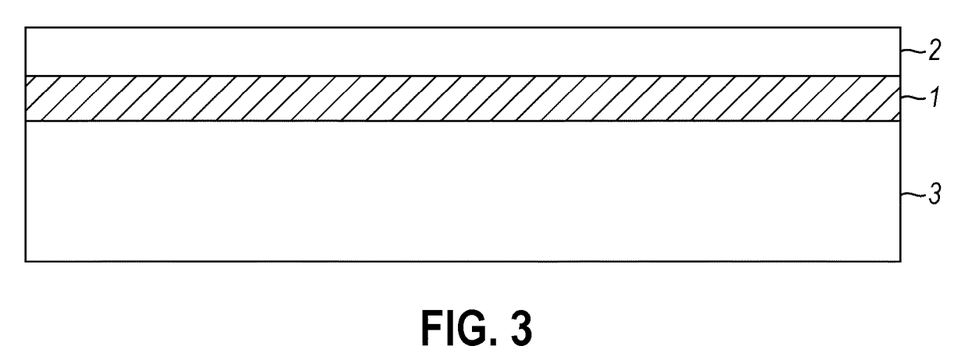
FIG. 3 is the second example construction using a cushion and/or mattress application.

FIG. 3 is the second example construction using a cushion and/or mattress application. The base of the section is a prime foam layer 3. On top of this is a 2 inch (5 cm) layer of TC Foam 1 followed by a 2 inch (5 cm) layer 2 of standard, open cell viscoelastic foam.

Figure 4:
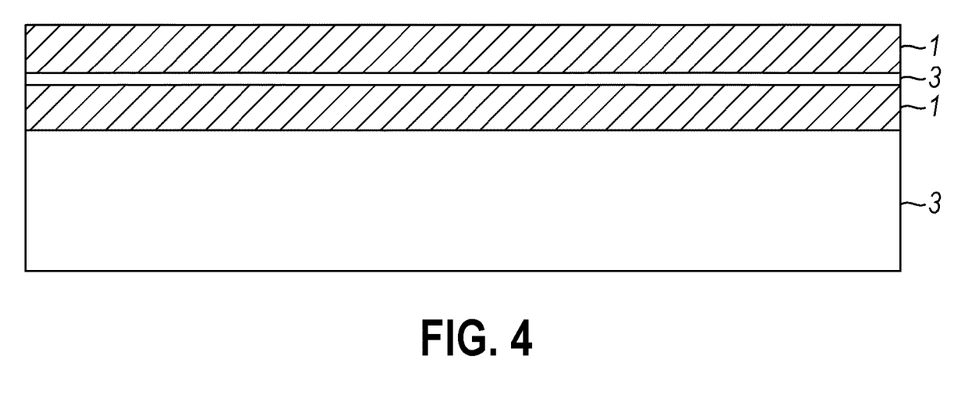
FIG. 4 is the third example construction using a cushion and/or mattress application.

FIG. 4 is the third example construction using a cushion and/or mattress application. The base of the section is a prime foam layer 3. On top of this is a 2 inch (5 cm) layer of TC Foam 1 followed by a 0.75 inch (1.9 cm) layer 3 of prime foam. The top layer is a second 2 inch (5 cm) layer of TC Foam 1.

Figure 5:
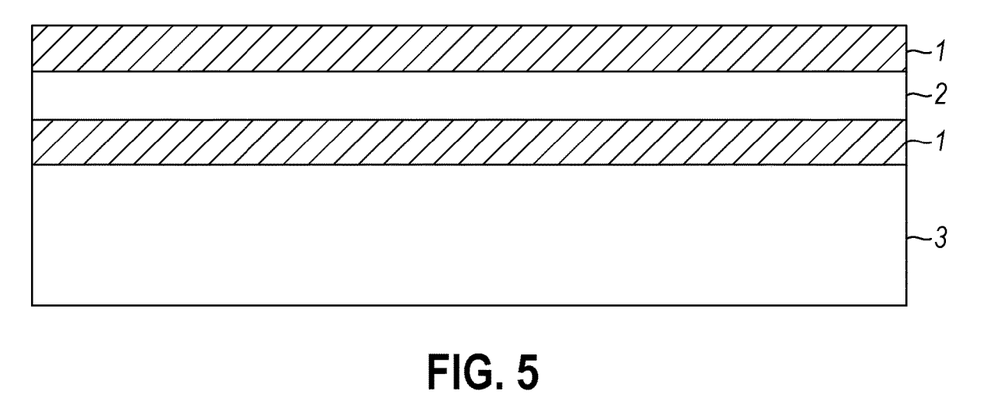
FIG. 5 is the fourth example construction using a cushion and/or mattress application.

FIG. 5 is the fourth example construction using a cushion and/or mattress application. The base of the section is a prime foam layer 3. On top of this is a 2 inch (5 cm) layer of TC Foam 1 followed by a 2 inch (5 cm) layer 2 of standard, open cell viscoelastic foam. The top layer is a second 2 inch (5 cm) layer of TC Foam 1.

Figure 6:
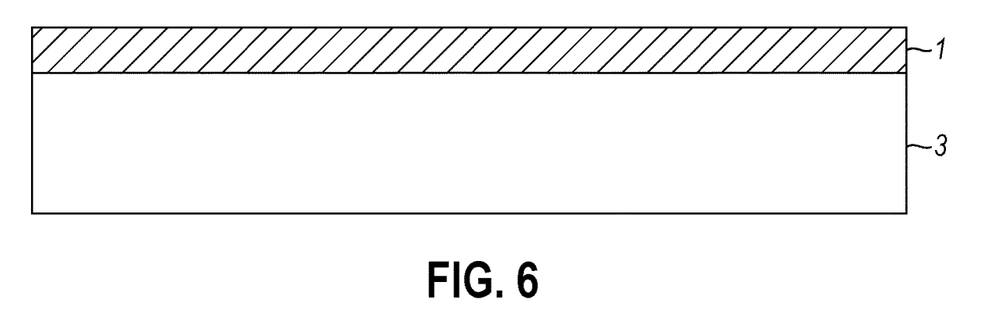
FIG. 6 is the fifth example construction using a cushion and/or mattress application.

FIG. 6 is the fifth example construction using a cushion and/or mattress application. The base of the section is a prime foam layer 3. On top of this is a 3 inch layer of TC Foam 1.

Figure 7:
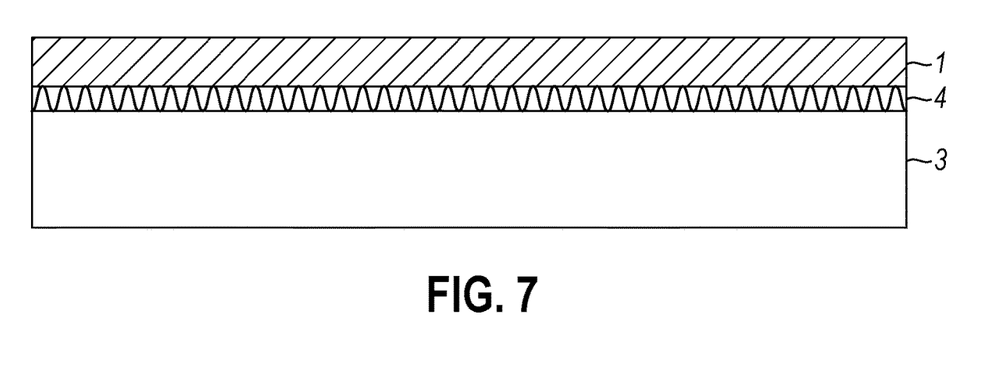
FIG. 7 is the sixth example construction using a cushion and/or mattress application.

FIG. 7 is the sixth example construction using a cushion and/or mattress application. The base of the section is a prime foam layer 3. On top of this is a 3 inch (7.6 cm) layer of TC Foam 1. The interface 4 between the two layers is a non-planar convolution, which may be made by convoluting the surface of either or both interfacing layers.

Figure 8:
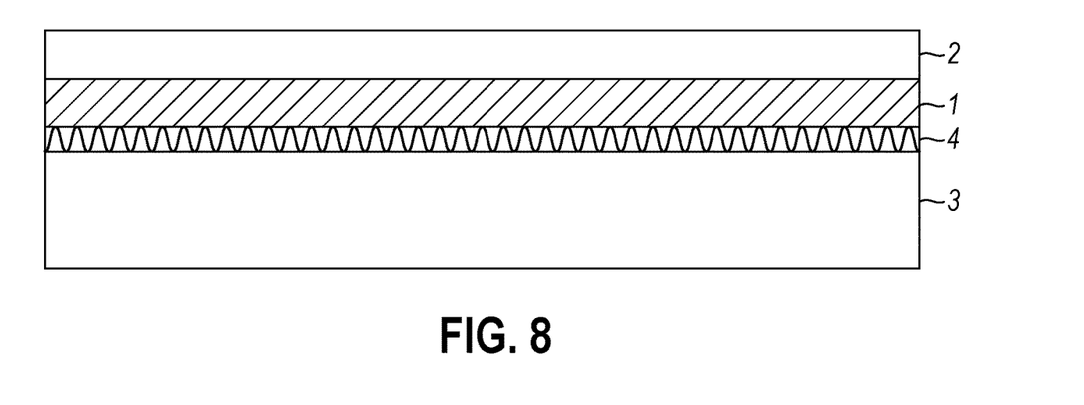
FIG. 8 is the seventh example construction using a cushion and/or mattress application.

FIG. 8 is the seventh example construction using a cushion and/or mattress application. The base of the section is a prime foam layer 3. On top of this is a 2 inch (5 cm) layer of TC Foam 1. The interface 4 between the two layers is a non-planar convolution, which may be made by convoluting the surface of either or both interfacing layers. The top of this example is a 2 inch (5 cm) layer 2 of standard, open-cell viscoelastic foam.

Figure 9:
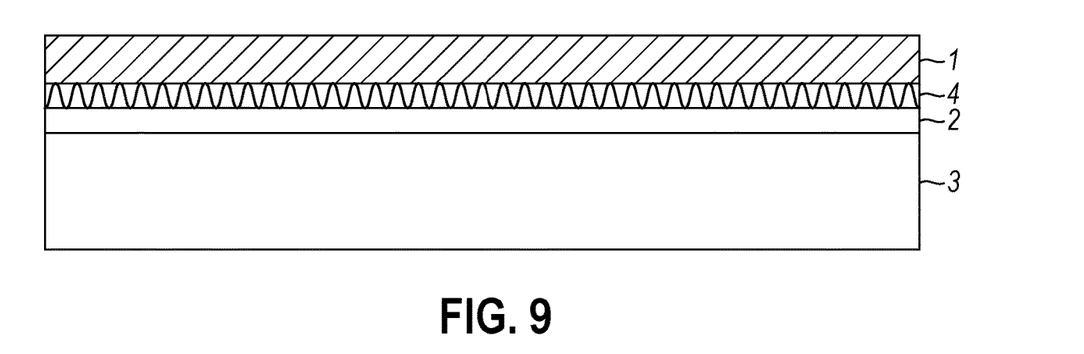
FIG. 9 is the eighth example construction using a cushion and/or mattress application.

FIG. 9 is the eighth example construction using a cushion and/or mattress application. The base of the section is a prime foam layer 3. Above this is a 2 inch (5 cm) layer 2 of standard, open-cell viscoelastic foam. On top of this is a 2 inch layer (5 cm) of TC Foam 1. The interface 4 between the two layers is a non-planar convolution, which may be made by convoluting the surface of either or both interfacing layers.

Figure 10:
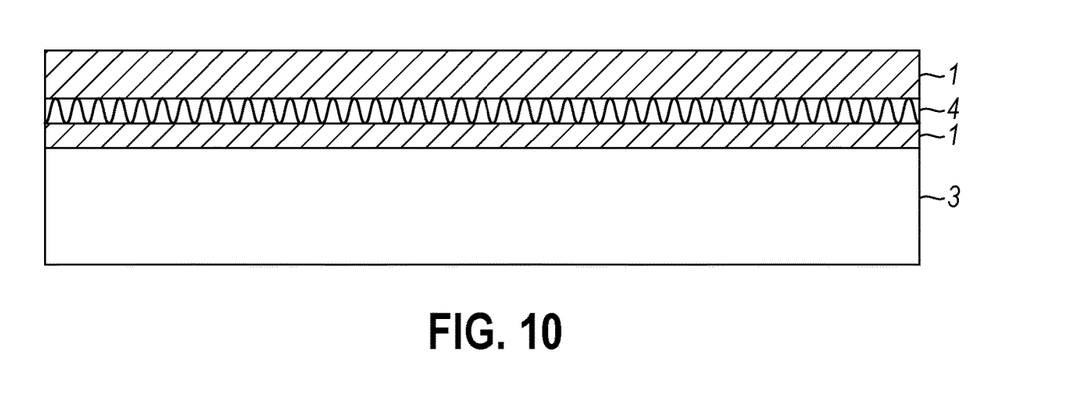
FIG. 10 is the ninth example construction using a cushion and/or mattress application.

FIG. 10 is the ninth example construction using a cushion and/or mattress application. The base of the section is a prime foam layer 3. Above this is a 2 inch (5 cm) layer of TC Foam 1. On top of this is another 2 inch (5 cm) layer of TC Foam 1. The interface 4 between the two layers is a non-planar convolution, which may be made by convoluting the surface of either or both interfacing layers.

Figure 11:
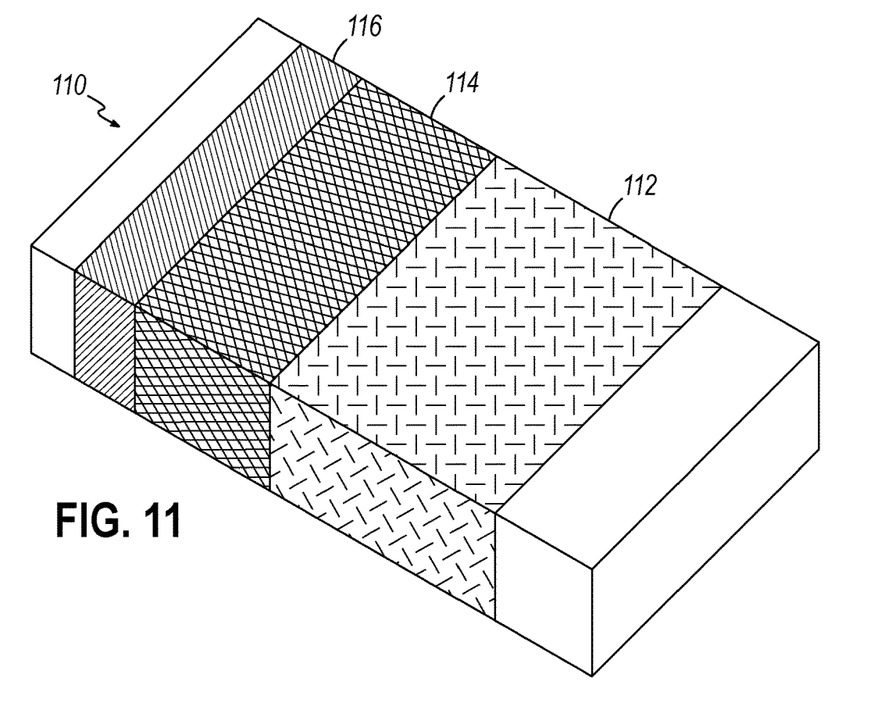
FIG. 11 is example breakdown of lateral mattress zones in a cushion and/or mattress application.

FIG. 11 is an example breakdown of lateral mattress zones or sections in a mattress 110. These zones include: lower body zone or section 112, torso/"belly band" zone or section 114, and head & shoulders zone or section 116. These zones or sections may or may not include TC Foams, example constructions, other mattress layer constructions, or any variation thereof. Furthermore, the zones shown are not limiting, but used as an example to show the possibility of utilizing enhanced thermally dissipating layers in specific areas of cushions and/or a mattress.

Figure 12:
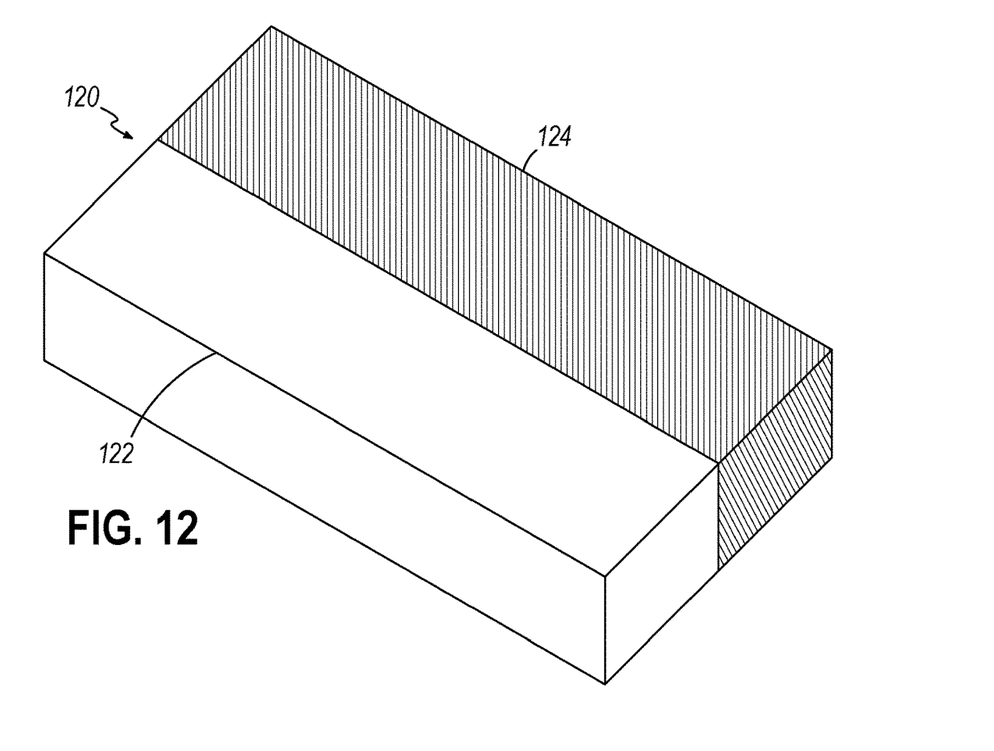
FIG. 12 is example breakdown of longitudinal mattress zones in a cushion and/or mattress application.

FIG. 12 is an example breakdown of longitudinal mattress zones 122 and 124 in a mattress 120. These zones include left section 122 and right section 124. These zones or sections 122 and 124 may or may not include TC Foams, example constructions, other mattress layer constructions, or any variation thereof. Furthermore, the zones shown are not limiting, but used as an example to show the possibility of utilizing enhanced thermally dissipating layers in specific areas of cushions and/or a mattress.

FIGS. 11 and 12 are meant to illustrate the usage of TC Foams in different regions of mattresses to enhance thermal conductivity in specific regions. They are not to be interpreted as limiting design figures. The exact configuration of these zoned TC Foams would be dependent on the purpose of the mattress construction.

Figure 13:
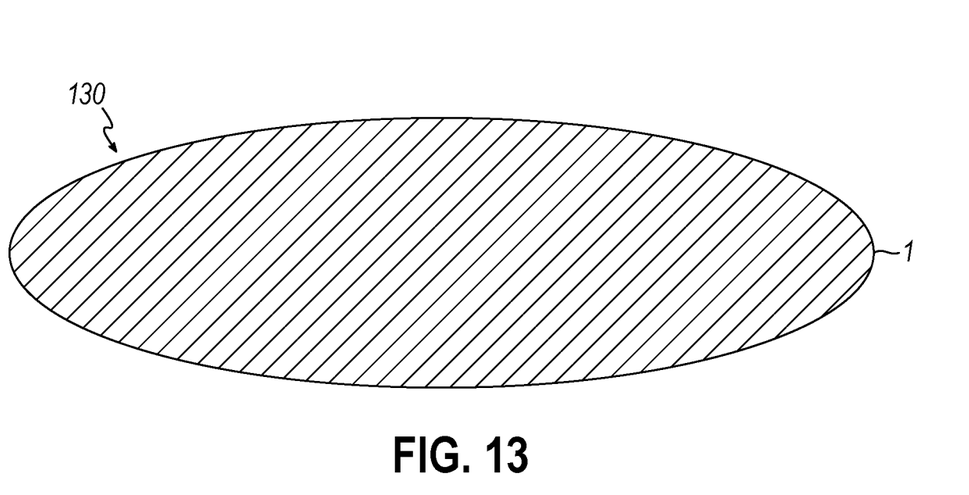
FIG. 13 is an example of a molded pillow product where the entire structure is molded from TC Foam.
Figure 14:
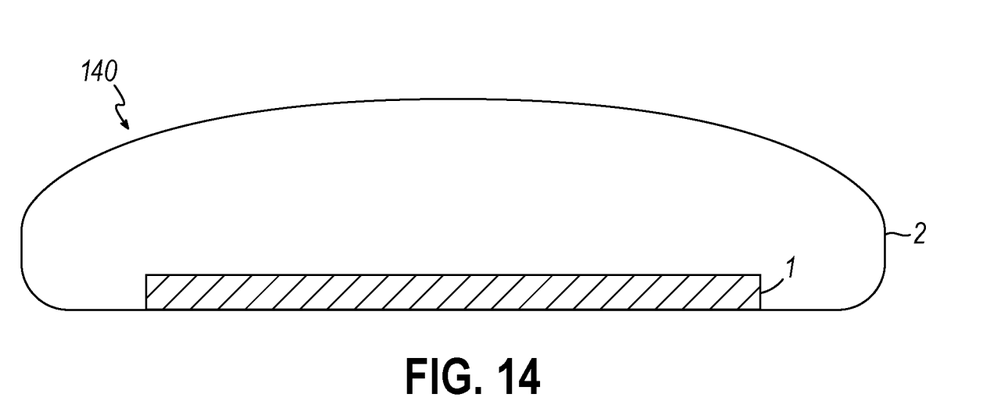
FIG. 14 is an example of a molded pillow product where the TC Foam is a region or layer within the pillow.

FIGS. 13 and 14 are depictions of molded pillow systems. FIG. 13 is a pillow 130 molded entirely out of TC Foam 1. Whereas FIG. 14 shows a pillow 140 using TC Foam 1 as a region within the overall pillow structure 2.

Figure 15:
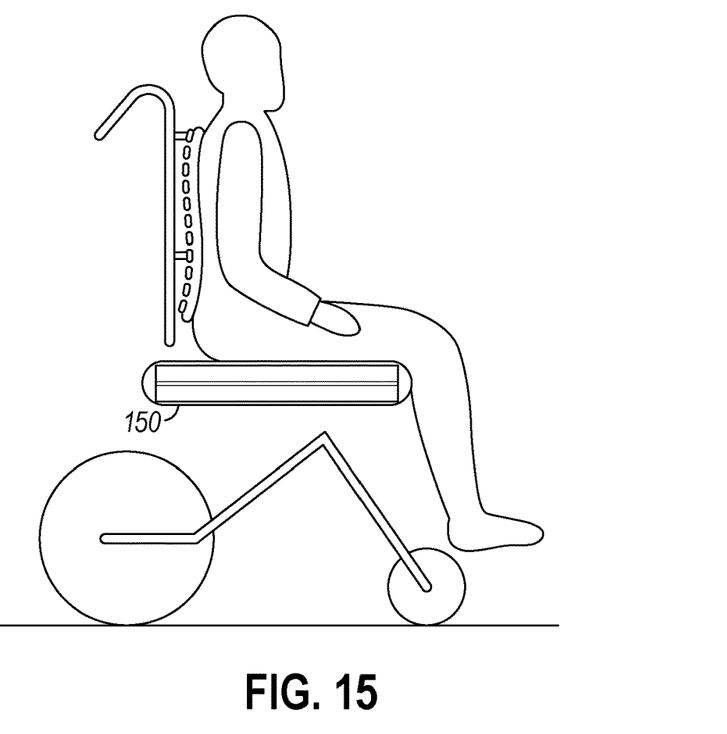
FIG. 15 is an example of a wheelchair seat using TC Foam in its construction.

FIG. 15 depicts the use of TC foam in a wheelchair seat cushion 150.

The invention will now be described more specifically with respect to particular formulations, methods and compositions herein to further illustrate the invention, but which examples are not intended to limit the methods and compositions herein in any way.

Example I

A two component system was obtained from Peterson Chemical Technology. The system consisted of a "B" side (PCT-M142B) containing polyols, surfactants, blowing and gelation catalysts and water, and the "A" side (PCT-M142A) consisted of an isocyanate compound. A pre-blend was made by combining 103.5 parts of the "B" side with 10 parts of LCF-1, an aluminum metal additive particulates (average particle size of about 200 microns) obtained from Peterson Chemical Technology, in a 32 oz. (0.95 L) mix cup. The components were mixed for approximately 45 seconds before adding 43.21 parts of the "A" side component, mixed an additional 10 seconds and poured into a 9"×9" (23 cm×23 cm) cake box and allowed to rise and cure in a room temperature environment. A flexible polyurethane foam was produced with aluminum metal material randomly dispersed throughout the foam structure. Physical properties such as density, IFD, and airflow were measured. Additionally measures of the static thermal conductivity were obtained by following ASTM E1225 standards for measurement.

A control foam was produced by an identical procedure but with the omission of the 10 parts of LCF-1 aluminum metal material. This foam was tested by the same procedures and used as a comparative control for the TC Foam.

Example II

A two component system was obtained from Peterson Chemical Technology. The system consisted of a "B" side (PCT-MCFB) containing polyols, surfactants, blowing and gelation catalysts and water, and the "A" side (PCT-MCFA) consisted of an isocyanate compound. A pre-blend was made by combining 100 parts of the "B" side with 10 parts of copper filament, obtained from Peterson Chemical Technology, in a 32 oz. (0.95 L) mix cup. The components were mixed for approximately 45 seconds before adding 46.08 parts of the "A" side component, mixed an additional 10 seconds and poured into a 9"×9" (23 cm×23 cm) cake box and allowed to rise and cure in a room temperature environment. A flexible polyurethane foam was produced with randomly dispersed copper filaments throughout the foam structure. Physical properties such as density, IFD, and airflow were measured. Additionally measures of the static thermal conductivity were obtained by following ASTM E1225 standards for measurement.

A control foam was produced by an identical procedure but with the omission of the 10 parts of copper filament. This foam was tested by the same procedures and used as a comparative control for the TC Foam.

Discussion of Results

Figure 16:
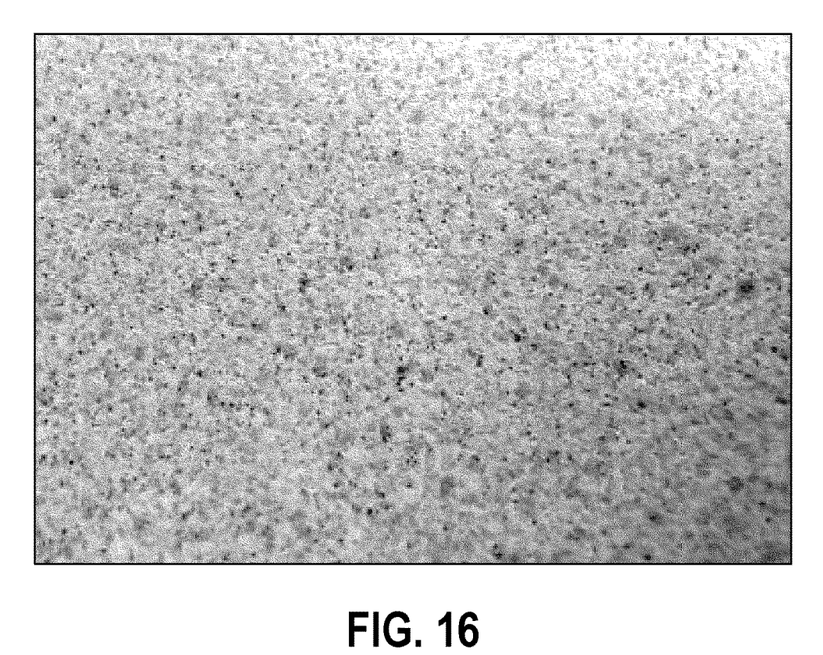
FIG. 16 is a picture of TC Foam from Example I with thermally conductive particulates incorporated in an open cell flexible polyurethane foam.

Table 1 shows the formula and test results for the two foams produced by following the procedure of Example I. The results indicate an increase in the thermal conductivity (Static TC) of the control foam by 27.2%, from 0.0478 W/(m-° K) to 0.0608 W/(m-° K). FIG. 16 is a black and white photograph of the TC foam produced in Example I, where the aluminum metal particulates were incorporated in an open-cell flexible polyurethane foam. The aluminum metal particulates appear black in color against the relatively lighter background foam color.

Table 2 shows the formula and test results for the two foams produced by following the procedure of Example II. The results indicate an increase in the thermal conductivity (Static TC) of the control foam by 41.1%, from 0.0511 W/(m-° K) to 0.0721 W/(m-° K).

TABLE 1

Comparison of Formula and Properties of Control and TC Foam of Ex. I

| Material | Measure | Control | EX. I |
|---|---|---|---|
| "B" Side | pbw | 103.5 | 103.5 |
| "A" Side | pbw | 43.21 | 43.21 |
| LCF-1 | pbw | 0 | 10 |
| Density | lbs/ft$^3$ (kg/m$^3$) | 3.45 (55.3 kg/m$^3$) | 3.62(58.0 kg/m$^3$) |
| IFD | lb$_f$/50 in$^2$ (N) | 9.1 (41 N) | 8.7 (39 N) |
| Airflow | SCFM | 4.94 | 4.30 |
| Static TC | W/(m-° K) | 0.0478 | 0.0608 |

TABLE 2

Comparison of Formula and Properties of Control and TC Foam of Ex. II

| Material | Measure | Control | EX II |
|---|---|---|---|
| "B" Side | pbw | 100 | 100 |
| "A" Side | pbw | 46.08 | 46.08 |
| Copper Filament | pbw | 0 | 10 |
| Density | lbs/ft$^3$ (kg/m$^3$) | 3.13 (50.1) | 3.45 (55.3) |
| IFD | lb$_f$/50 in$^2$ (N) | 10.1 (45 N) | 12.4 (55 N) |
| Airflow | SCFM | 4.14 | 3.93 |
| Static TC | W/(m-° K) | 0.0511 | 0.0721 |

Many modifications may be made in the methods of and implementation of this invention without departing from the spirit and scope thereof that are defined only in the appended claims. For instance, various combinations of phase change materials or phase change additives, gels, polyols, isocyanates, catalysts, metal materials (including sizes and shapes of metal material particulates) and other additives, and processing pressures and conditions besides those explicitly mentioned herein are expected to be useful.

The words "comprising" and "comprises" as used throughout the claims is interpreted "including but not limited to". The present invention may suitably comprise, consist or consist essentially of the elements disclosed and may be practiced in the absence of an element not disclosed. In a non-limiting instance, there may be provided a thermally conductive (TC) foam that consists essentially of or consists of a flexible cellular foam, and a plurality of metal material particulates dispersed in the flexible cellular foam in an amount effective to improve the thermal conductivity of the flexible cellular foam, where the TC foam has improved thermal conductivity as compared to an otherwise identical flexible cellular foam with an absence of the metal material particulates, where the improved thermal conductivity is at least 0.002 W/(m-° K) higher than the flexible cellular foam with an absence of the metal material particles.

Alternatively, a thermally conductive (TC) latex foam may consists essentially of or consists of a cross-linked latex foam and a plurality of metal material particulates dispersed in the cross-linked latex foam in an amount effective to improve the thermal conductivity of the cross-linked latex foam, where the TC latex foam has improved thermal conductivity as compared to an otherwise identical latex foam with an absence of the metal material particulates, where the improved thermal conductivity is at least 0.002 W/(m-° K) higher than the cross-linked latex foam with an absence of the metal material particles.

There may also be provided a thermally conductive (TC) melamine foam consisting essentially of or consisting of a cross-linked melamine foam and a plurality of metal material particulates dispersed in the cross-linked melamine foam in an amount effective to improve the thermal conductivity of the cross-linked melamine foam, where the TC melamine foam has improved thermal conductivity as compared to an otherwise identical melamine foam with an absence of the metal material particulates, where the improved thermal conductivity is at least 0.002 W/(m-° K) higher than the cross-linked melamine with an absence of the metal material particles.

What is claimed is:

1. A thermally conductive (TC) foam comprising:
a flexible cellular foam, and
a plurality of metal material particulates dispersed in the flexible cellular foam, where the metal material is selected from the group consisting of aluminum, silver, platinum, titanium, and tungsten, and combinations of any of these, and where the metal material particulates have an average particle size range from about 0.1 to about 2000 microns, where the TC foam has improved thermal conductivity as compared to an otherwise identical flexible cellular foam with an absence of the metal material particulates, where the improved thermal conductivity is at least 0.002 W/(m-° K) higher than the flexible cellular foam with an absence of the metal material particulates, and where the metal material particulates contain a thermal conductivity ranging from 5-440 W/(m-° K).

2. The thermally conductive foam of claim 1 wherein said average particle size is between about 0.1 to 1000 microns.

3. The thermally conductive foam of claim 1 wherein said average particle size range is between about 0.1 to 500 microns.

4. The thermally conductive foam of claim 1 wherein said flexible cellular foam has a thermal conductivity ranging from at least about 0.01 W/(m-° K) higher than the flexible cellular foam with an absence of metal material particulates.

5. The thermally conductive foam of claim 1 wherein said flexible cellular foam has a thermal conductivity ranging from at least about 0.005 W/(m-° K) higher than the flexible cellular foam with an absence of metal material particulates.

6. The thermally conductive foam of claim 1 where the thermally conductive foam is produced by a method comprising: introducing the plurality of metal material particulates into a mixture of flexible cellular foam-forming components comprising a polyol and an isocyanate; and polymerizing the polyol and the isocyanate to form the flexible cellular foam.

7. The thermally conductive foam of claim 1 wherein said metal material particulates exhibit an electrical conductivity with a resistivity ρ, wherein ρ<10$^{-2}$ Ω·m.

8. An article of manufacture comprising the thermally conductive foam of claim 1 where the article of manufacture is selected from the group consisting of medical cushioning foams, mattresses, pillows, bedding products, mattress pillow toppers, quilted mattress toppers, mattress toppers, and combinations thereof.

9. A thermally conductive (TC) foam comprising:
a flexible cellular foam, and
a plurality of thermally conductive particulates dispersed in the flexible cellular foam,
wherein the thermally conductive particulates are selected from the group consisting of aluminum, silver, platinum, titanium, and tungsten, and combinations of any of these, wherein the thermally conductive particulates have an average particle size range from about 0.1 to about 2000 microns, where the TC foam has improved thermal conductivity as compared to an otherwise identical flexible cellular foam with an absence of the thermally conductive particulates, where the improved thermal conductivity is at least 0.005 W/(m-° K) higher than the flexible cellular foam with an absence of the thermally conductive particulates, and where the thermally conductive particulates contain a thermal conductivity ranging from 5-440 W/(m-° K).

10. The thermally conductive foam of claim 9 wherein said thermally conductive particulates are selected from the group consisting of aluminum, silver, platinum, titanium, and tungsten.

11. The thermally conductive foam of claim 9 wherein said average particle size is between about 0.1 to 1000 microns.

12. The thermally conductive foam of claim 9 wherein said average particle size range is between about 0.1 to 500 microns.

13. The thermally conductive foam of claim 9 wherein said flexible cellular foam has a thermal conductivity ranging from at least about 0.01 W/(m-° K) higher than the flexible cellular foam with an absence of thermally conductive particulates.

14. The thermally conductive foam of claim 9 wherein said flexible cellular foam has a thermal conductivity ranging from at least about 0.002 W/(m-° K) higher than the flexible cellular foam with an absence of thermally conductive particulates, and the particulates are dispersed in random dispersions, uniform dispersions, and combinations thereof.

15. The thermally conductive foam of claim 1 wherein said flexible cellular foam has a thermal conductivity ranging from at least about 0.005 W/(m-° K) higher than the flexible cellular foam with an absence of thermally conductive particulates, and the particulates are dispersed in random dispersions, uniform dispersions, and combinations thereof.

* * * * *